United States Patent [19]
Clougherty et al.

[11] 3,775,137
[45] Nov. 27, 1973

[54] REFRACTORY DIBORIDE MATERIALS

[75] Inventors: Edward V. Clougherty, West Roxbury; Lawrence Kaufman, Brookline, both of Mass.; David Kalish, Atlanta, Ga.

[73] Assignee: Man-Labs, Incorporated, Cambridge, Mass.

[22] Filed: Dec. 22, 1971

[21] Appl. No.: 211,078

Related U.S. Application Data

[63] Continuation-in-part of Ser. No. 746,279, July 22, 1968, abandoned.

[52] U.S. Cl..................................... 106/44, 106/57
[51] Int. Cl.. C04b 35/56, C04b 35/58, C22c 29/00
[58] Field of Search ..................... 106/43, 44, 57, 55

[56] References Cited
UNITED STATES PATENTS

| | | | |
|---|---|---|---|
| 2,445,296 | 7/1948 | Wejnarth | 106/44 |
| 2,814,566 | 11/1957 | Glaser | 106/44 |

*Primary Examiner*—Helen M. McCarthy
*Attorney*—Alfred H. Rosen and Frank A. Steinhilper

[57] ABSTRACT

New and improved diboride materials containing $TiB_2$, $ZrB_2$, $HfB_2$, $NbB_2$, $TaB_2$ or mixtures thereof are produced by adding about 10 percent to 35 percent by volume of SiC, and preferably about 20 percent by volume SiC. Improved properties include, among others, lower fabrication temperature, grain size control, oxidation resistance, mechanical integrity, strength to density ratio, thermal stress resistance, and the like.

2 Claims, No Drawings

REFRACTORY DIBORIDE MATERIALS

This application is a continuation-in-part of U.S. patent application, Ser. No. 746,279, filed July 22, 1968, now abandoned.

BACKGROUND OF THE INVENTION

New refractory materials are constantly being required to meet the needs of modern industry and of space technologies. While the pure refractory metals with melting points about 2,000°C, such as molybdenum, tantalum and tungsten, generally have many satisfactory properties, they all oxidize catastrophically in air at elevated temperatures (that is, temperatures above 1,200°C.). For structural applications, it has been necessary to investigate refractory metal compounds such as borides, silicides, carbides and aluminides of these metals, which exhibit better oxidation resistance. While certain metals and alloys have value as high temperature materials, the borides and silicides of the transition elements in Groups IV, V and VI of the periodic table (Ti, Zr, Hf, V, Nb, Ta, Cr, Mo, W) have been found to be particularly attractive in this respect. Empirically, molybdenum disilicide and zirconium diboride are among the most valuable prior high temperature materials.

These refractory metal compounds also may have several problems. For example, a number of materials, particularly including those which have been used to avoid oxidation and its consequences have certain mechanical and processing problems which impair their use for certain purposes. Among the improvements needed are improved mechanical properties, improvement in thermal stress resistance, reduction in the temperature required for fabrication of high density billets relative to the same refractory compound with no additive, improvement in the mechanical integrity of fabricated billets, and the like.

In application Ser. No. 746,279 there were disclosed certain combinations of silicon carbide with zirconium diboride, titanium diboride, hafnium diboride, niobium diboride and tantalum diboride. Of these combinations, it has been found that the combination of silicon carbide with zirconium diboride is most advantageous.

SUMMARY OF THE INVENTION

The use of silicon carbide with zirconium diboride in controlled percentage composition effects improvements in oxidation resistance, thermal stress resistance, mechanical integrity and various other improvements without greatly reducing the high temperature performance of the base diboride materials as would obtain if low melting metal binders were used to effect improvements in strength and enhance fabrication. The latter procedure is well known and has been used to develop many "cermet" materials such as the tungsten carbide-cobalt binder materials.

GENERAL STATEMENT OF THE INVENTION

We have found that the desired results can be achieved by incorporating in a zirconium diboride material about 10 percent by volume to about 35 percent by volume of SiC, to produce a material having these properties improved in combination. A number of materials of improved properties have been made with about 1 part by volume of SiC to about 4 parts by volume of diboride, and a preferred composition is about 20 volume per cent silicon carbide and about 80 volume per cent zirconium diboride. While retaining the advantages of the diboride alone, the zirconium diboride-silicon carbide hot pressed product has greatly increased oxidation resistance. The product has fine grain size. A hot pressed product of excellent mechanical integrity and virtually 100 percent theoretical density can be produced at lower fabrication temperature. Good thermal stress resistance is achieved, and a high strength to density ratio is achieved. The products are primarily the diboride, modified to improve oxidation resistance and other properties.

DETAILED DESCRIPTION OF THE INVENTION

A number of diboride materials were prepared for comparative test purposes. A general procedure for the preparation, and one employed for test data herein, was as follows, using the same grades of materials for the purpose of avoiding unintentional variation in product. The diboride powders (commercially available -325 mesh or finer) are dry milled with silicon carbide powders (commercially available, $5\mu$ average particle size), and the mixture is transferred to the mold of a conventional hot pressing apparatus and consolidated. There is not a specific threshold of size of the powders critical to the operability of the invention, but finer starting powders produce billets with finer grain sizes and consequently higher strength and related mechanical properties.

The diboride article in accordance with the present invention is a hot pressed mixture of $ZrB_2$ and SiC. Similar results have been achieved with like volume per cent of silicon carbide mixed with $TiB_2$, $HfB_2$, $TaB_2$ and $NbB_2$, but hot pressed $ZrB_2$ mixtures with SiC are now preferred. The resulting billet contains a fine grained diboride matrix with discrete grains of silicon carbide. The aforesaid article of this invention is characterized by improved mechanical integrity, nearly full relative density for fine grained billets (5 to 10 micron average grain size), improved oxidation resistance, and improved thermal stress resistance. The resulting billet has a very high density generally of about 99 percent of the fully dense mixture.

An advantage of the present invention is that lower hot pressing temperatures can be used to provide a high density billet whereas commercially available zirconium diboride with the silicon carbide additive requires higher fabricating temperatures and longer times to provide dense articles and such conditions produce grain growth and lower strength values. Mechanical integrity is also reduced as evidenced by a higher incidence of cracking in these diborides when SiC is not present as an additive.

Commercially available $ZrB_2$ powder contains oxygen as a major impurity. It is common for hot pressed articles of $ZrB_2$ to contain five to ten volume per cent of an oxygen containing impurity phase such as $ZrO_2$. We have found the amount of such impurity phase content is reduced in hot pressed articles of $ZrB_2$ + SiC, and commercially available materials may be used in the present invention.

The new products, combining oxidation resistance and vastly improved mechanical properties, are particularly useful for uses requiring high temperature retention of mechanical strength, including for example, critical mechanical parts in high velocity vehicles such as nose cones, leading edges and the like, as well as forms and dies and the like.

In addition to enhancing the properties cited above, the addition of silicon carbide to zirconium diboride reduces the total cost of powder required to prepare a given sized billet.

It is convenient to provide a collective demonstration of the improvements as such properties are related to a common improvement in the fabricated article such as fine grain size, high density, improved mechanical integrity, etc.

It is common knowledge in ceramic material characterization that fine grain size and high density promote improved strength properties.

We have found that high density (99 to 100 percent) articles of $ZrB_2$ with no additive can only be obtained with average grain sizes in the range of 35 to 50 microns; such materials have transverse bend strengths of 40,000 to 50,000 psi at room temperature and 20,000 to 30,000 psi at 1800°C. The incidence of cracking in such billets exceeds 30 percent. The addition of SiC to $ZrB_2$ reduces very substantially the fabrication temperature required to produce equivalent relative density and, moreover, over certain ranges of processing conditions, a relative density can be achieved with about 20 percent by volume SiC which cannot be achieved at normal pressing temperature without the SiC. The incidence of cracking in billets containing diboride and SiC is substantially eliminated. Further, 99 to 100 percent dense articles of $ZrB_2$ + SiC can be obtained with average grain sizes of 6 to 8 microns; such materials have transverse bend strengths of 50,000 psi at room temperature and 40,000 psi at 1800°C. The high temperature strength of diboride compositions containing SiC is increased by at least 20 percent and often by more than 40 percent in $ZrB_2$ materials.

The addition of SiC lowers the density of zirconium diboride. The reduction in density coupled with the enhanced strength properties effects a pronounced improvement in the strength to density or strength to mass ratio.

Similarly there was about 50 percent improvement in high temperature corrosion resistance to atmospheres containing fluorine for hafnium diboride mixtures containing 30 volume per cent SiC compared to $HfB_2$ with no additive, and comparable improvement is realized throughout the ranges of proportions in the materials of the invention. The SiC diboride material is characterized by a lower surface recession rate which decreases with increasing temperature than that observed for $ZrB_2$ (which increases with increasing temperature).

Inasmuch as the invention is operative with the diboride compound in both stoichiometric (whole-number atomic) and non-stoichiometric (other than whole-number atomic) proportions, use of the term $ZrB_2$ in the claims which follow is intended to include both the whole-number atomic proportions for the compound and the proportions other than the whole-number atomic proportions, unless the context of the claim specifically limits the term to a smaller range of proportions.

EXAMPLE I

A number of hot pressed articles in the shape of cylinders were made with mixtures of commercially available zirconium diboride powder and commercially available silicon carbide powder. Zirconium diboride powder, 325 mesh or finer, and the silicon carbide powder, 5 micron average particle size, were mixed and dry milled in the proportions of 88 per cent by weight zirconium diboride and 12 per cent by weight silicon carbide, this being equivalent to 80 per cent by volume zirconium diboride and 20 per cent by volume silicon carbide. The mixed powders were transferred to a hot press, and were hot pressed at 4,000 pounds per square inch for about two hours. Various pressings were made at temperatures of 2150°C., 2100°C, at 2050°C. and at 2000°C. In all cases, densities higher than 95 percent of theoretical density were achieved, and in most cases virtually 100 percent density was achieved.

In comparative procedures, zirconium diboride powder alone was pressed under the same conditions, and in each case, the zirconium diboride hot pressed article was less dense than the $ZrB_2$-SiC hot pressed article.

Hot pressed $ZrB_2$-SiC articles as thus produced were tested for oxidation resistance by placing them in a furnace heated to a controlled temperature. At the desired temperature, air was introduced into the furnace, passed through a tube heated to the furnace temperature to bring the air to approximately the controlled furnace temperature. The air was then passed across the surface of the test cylinder. The test procedure was checked to avoid an oxidation test which would be gas supply limited. The test cylinder was held at the temperature for a period of time, usually one hour. At the end of the desired test time, air was replaced by a controlled inert atmosphere. Finally, the furnace and sample were cooled. A measure of oxidation resistance is the number of thousandths of an inch of oxide on the surface of the article after such exposure to oxidizing conditions. Under these test conditions, oxide thickness of at least about 0.100 inch resulted in the control article of zirconium diboride alone, oxidized at 1,900°C. or higher, whereas oxide thickness of 0.002 to 0.010 result at test temperatures of 1,800°C. to 2,000°C. for the $ZrB_2$-SiC hot pressed products.

EXAMPLES II THROUGH IV

The procedure of Example I was repeated for the production of other hot pressed mixtures of zirconium diboride and silicon carbide as follows: Example II, 90 volume per cent $ZrB_2$, 10 volume per cent SiC; Example III, 85 volume per cent $ZrB_2$, 15 volume per cent SiC; Example IV, 65 volume per cent $ZrB_2$, 35 volume per cent SiC. The products had good mechanical integrity, being capable of being removed from the mold without cracking. All the products were of fine grain size. All the products had good oxidation resistance according to the oxidation test used in connection with Example I.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims. The results obtained with zirconium diboride-silicon carbide hot pressed articles are essentially unchanged if up to one-fourth of the zirconium diboride is replaced with one of the other diborides including TiB$_2$, HfB$_2$, NbB$_2$ or TaB$_2$. Specifically, if it is economically feasible to replace up to 1/4 of the less expensive zirconium diboride with more expensive hafnium diboride, the results will be excellent.

We claim:

1. A formed diboride refractory article having improved high temperature characteristics, consisting essentially of a shaped mixture of zirconium diboride and, as a dispersed phase therein, between about 10 and about 35 per cent by volume silicon carbide, said mixture fabricated by hot pressing.

2. A formed diboride refractory article according to claim 1, wherein the silicon carbide is in an amount of about 20 per cent by volume.

* * * * *